UNITED STATES PATENT OFFICE.

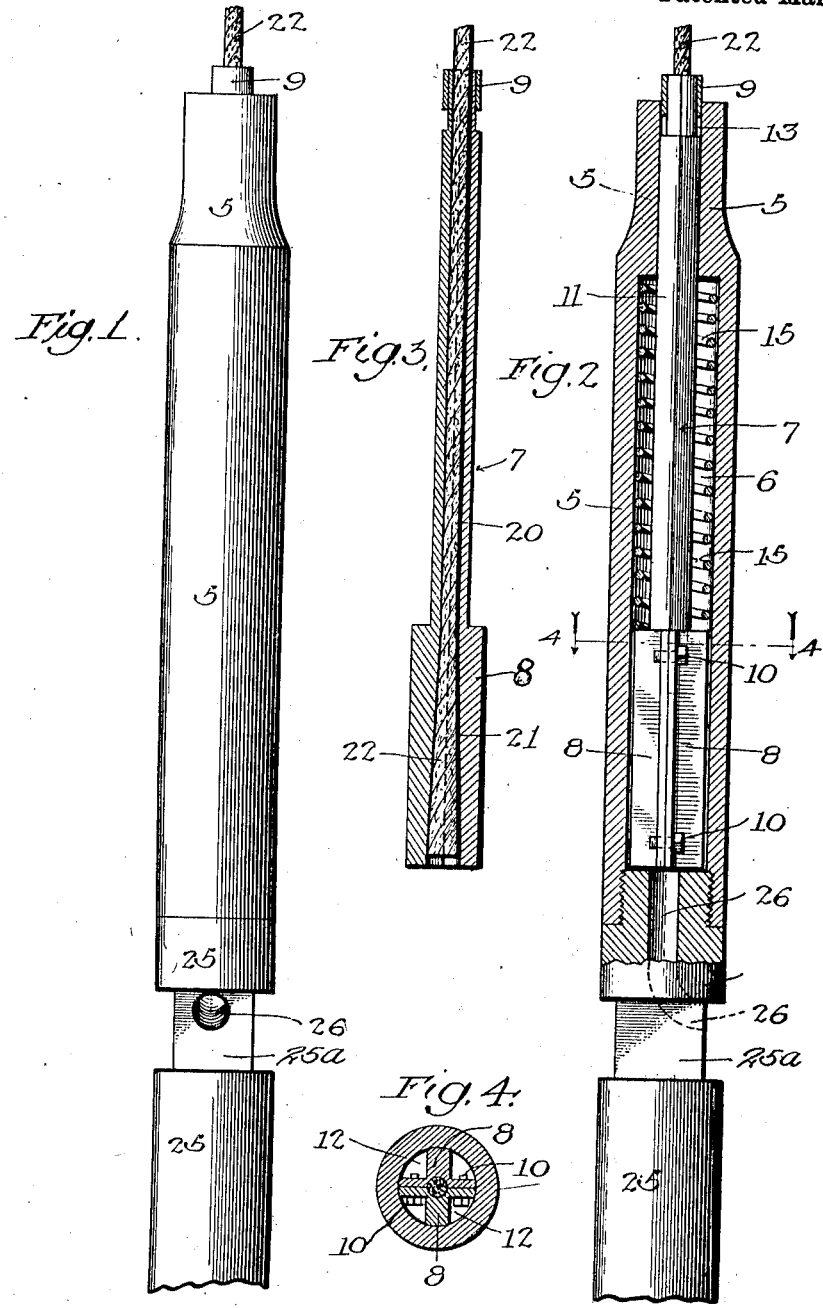

HERBERT L. JARVIS, DECEASED, LATE OF McKITTRICK, CALIFORNIA, BY ROSE LOUISE JARVIS, ADMINISTRATRIX, OF BAKERSFIELD, CALIFORNIA, ASSIGNOR OF ONE-THIRD TO JOHN M. SANDS, OF LOS ANGELES, CALIFORNIA, AND ONE-THIRD TO GEORGE W. CHURCH, OF BAKERSFIELD, CALIFORNIA.

SWIVEL ROPE-SOCKET.

1,019,794.  Specification of Letters Patent. Patented Mar. 12, 1912.

Application filed November 2, 1910. Serial No. 590,255.

*To all whom it may concern:*

Be it known that I, ROSE L. JARVIS, administratrix of the estate of HERBERT L. JARVIS, deceased, late a citizen of the United States, residing at McKittrick, in the county of Kern and State of California, do declare that the said HERBERT L. JARVIS did invent new and useful Improvements in Swivel Rope-Sockets, of which the following is a specification.

This invention relates to a swivel rope socket especially adapted for the connection of a drilling line to the drilling tools in oil or other well work; and the object thereof is to provide a simple and reliable mechanism in which the cable may be easily and securely clamped and which will allow the tools hanging below to have a swiveling motion on the cable.

Another object is to provide a resilient action so that the cable is relieved from all sudden strains and shocks and the drilling made smoother and more uniform.

In this improved device the usual end thrust bearing, comprising balls or rollers, is obviated and a simple resilient member placed in its stead. The resilient member, in the form of a spring, affords the desired elasticity of action and also allows the socket to effect a swiveling motion without the necessity of any special bearing. Means are provided for the easy and efficient clamping of the cable by making the clamping member in two halves and adapting it to be secured together around the cable. By means of this construction the cable may be clamped tightly into place so that it is almost impossible for it to be pulled out.

In the accompanying drawings: Figure 1 is an elevation of the improved socket shown in connection with a cable and a string of drilling tools. Fig. 2 is a longitudinal section of the same. Fig. 3 is a sectional view of the inner cable clamping member. Fig. 4 is a cross section taken on line 4—4 of Fig. 2.

In the drawings 5 designates an outer shell and mandrel provided with a hollow interior 6 in which cable clamping member 7 is placed. Cable clamping member 7 is made in two halves 8 which are secured together by a ferrule 9 at their upper end and by bolts 10 at their lower end. The upper end of the cable clamping member is cylindrical as at 11, while the lower end is fluted as at 12. The upper cylindrical end 11 is reduced in size so as to pass through bore 13 in the upper end of mandrel 5. The lower fluted end of the cable clamping member fits movably into hollow interior 6 of the mandrel. A coiled spring 15 is placed in the mandrel above the enlarged lower end of the cable clamping member and around reduced portion 11. This spring tends to force the cable clamping member down in the mandrel.

The cable clamping member is provided with a central bore 20 which is tapered and enlarged at 21 at its lower end. Cable 22 is placed in this central bore, the cable having previously been expanded at its lower end by the insertion of a stuffing into its interior at this point. The halves of the clamping member are clamped up around the cable so that it is then impossible to pull the cable up and out of the clamping member. One of the main features of this clamping member is the ease with which the cable may be extracted. In the ordinary socket the cable is pulled up tightly into place in a tapering bore and it becomes necessary to drive the cable out—an arduous process. In the socket herein disclosed the clamping member may be loosened around the cable and the cable removed without any difficulty whatever.

To the lower end of mandrel 5 is joined a member 25 which connects with a string of drilling tools in the usual manner. Member 25 is provided with an aperture 26 leading from the interior hollow of the mandrel to the outside so that any water or slush which may work into the mandrel may pass out freely. The flutings in the lower portion of the clamping member also facilitates the passage of such material. Portion 25ª is square to permit engagement by a wrench for turning and screwing the socket to the string of tools.

In operating this device it will be seen that the cable is easily and efficiently clamped in the socket and released therefrom when it is desired to make a change. When drilling, upon each downward stroke of the tools, spring 13 is compressed. The spring is sufficiently strong to carry the weight of the tools under conditions of equilibrium and rest, but at the bottom of the stroke, when the tools are moving downwardly with great momentum and when the cable is being retarded in its downward movement, the spring is compressed and the tools strike the bottom of the hole on a resilient or springy movement. This is precisely what is desired for efficient and rapid drilling and for keeping the hole straight and otherwise in good condition.

From the foregoing it will be seen that this invention consists primarily in these points; the provision of a resilient swivel action, whereby the tools are operated resiliently and are also allowed to turn so as to keep the hole truly cylindrical; and the provision of a simple and efficient clamping means for the cable, so that the cable may be easily placed in position and easily withdrawn when it is desired to change the cable for any reason.

What is claimed as new is:

A rope socket, comprising a hollow mandrel having a longitudinal bore, a rope clamp loosely arranged in said bore and having a substantially cylindrical portion projecting out of the mandrel at its upper end, the clamp comprising two halves each having a longitudinal groove enlarged at one end, the lower parts of each half being provided with longitudinal flanges, bolts passing through the said flanges to hold the clamp halves together, a ferrule surrounding the upper ends of the clamp halves, and a spring in the mandrel and pressing downwardly on the rope clamp.

In witness that I claim the foregoing, I have hereunto subscribed my name this 13th day of October, 1910.

ROSE LOUISE JARVIS,
*Administratrix of the estate of Herbert L. Jarvis, inventor, deceased.*

Witnesses:
E. L. FOSTER,
G. B. HOWELL.

---

Copies of this patent may be obtained for five cents each, by addressing the "Commissioner of Patents, Washington, D. C."